US006359879B1

United States Patent
Carvey et al.

(10) Patent No.: US 6,359,879 B1
(45) Date of Patent: Mar. 19, 2002

(54) COMPOSITE TRUNKING

(75) Inventors: Philip P. Carvey, Bedford, MA (US); William J. Dally, Stanford, CA (US); Larry R. Dennison, Norwood, MA (US)

(73) Assignee: Avici Systems, North Billerica, MA (US)

( * ) Notice: Subject to any disclaimer, the term of this patent is extended or adjusted under 35 U.S.C. 154(b) by 0 days.

(21) Appl. No.: 09/073,842

(22) Filed: May 6, 1998

Related U.S. Application Data (60) Provisional application No. 60/082,923, filed on Apr. 24, 1998.

(51) Int. Cl.[7] .................. H04L 12/28; H04L 12/56; G06F 15/173
(52) U.S. Cl. .................. 370/351; 370/392; 370/902; 709/238; 709/244
(58) Field of Search .................. 370/351, 356, 370/360, 389, 386, 392, 395–396, 422, 364, 902, 398; 709/238, 244

(56) References Cited

U.S. PATENT DOCUMENTS 4,340,775 A * 7/1982 Gesek et al. .................. 370/364
5,546,379 A    8/1996 Thaweethai et al. ........ 370/252

FOREIGN PATENT DOCUMENTS

| EP | 0 649 098 A2 | 4/1995 |
| EP | 0 863 646 A2 | 9/1998 |
| EP | 0 910 195 A2 * | 4/1999 |

OTHER PUBLICATIONS

Stunkel, C.B., et al., "The SP2 High–Performance Switch," IBM Systems Journal, vol. 34, No. 2, 1995, pp. 184–204.

Conant, George E., "Multilink PPP: One Big Virtual WAN Pipe," Data Communications, vol. 24, No. 13, Sep. 1995, pp. 85–88.

* cited by examiner

*Primary Examiner*—Wellington Chin
*Assistant Examiner*—Maikhanh Tran
(74) *Attorney, Agent, or Firm*—Hamilton, Brook, Smith and Reynolds (57) ABSTRACT

An Internet router treats plural output ports with a common destination as a composite port. A routing table uses the IP address to determine a composite trunk to which the packet is to be forwarded. A forwarding table identifies a route along a routing fabric within the router to a specific output port of the composite port. Output ports and fabric routes are selected to maintain order within a flow by routing the flow along a single fabric route to a single output trunk. The forwarding table may favor output ports which are nearest to a packet input port, and the forwarding table may be modified to dynamically balance load across the trunks of a composite trunk.

26 Claims, 5 Drawing Sheets

COMPOSITE TRUNKING

RELATED APPLICATION

This application claims the benefit of U.S. Provisional Application No. 60/082,923, filed Apr. 24, 1998, the entire teachings of which are incorporated herein by reference.

BACKGROUND OF THE INVENTION

Data communication between computer systems for applications such as web browsing, electronic mail, file transfer, and electronic commerce is often performed using a family of protocols known as IP (Internet protocol) or sometimes TCP/IP. As applications that use extensive data communication become more popular, the traffic demands on the backbone IP network are increasing exponentially. It is expected that IP routers with several hundred ports operating with aggregate bandwidth of Terabits per second will be needed over the next few years to sustain growth in backbone demand.

Figure 1:
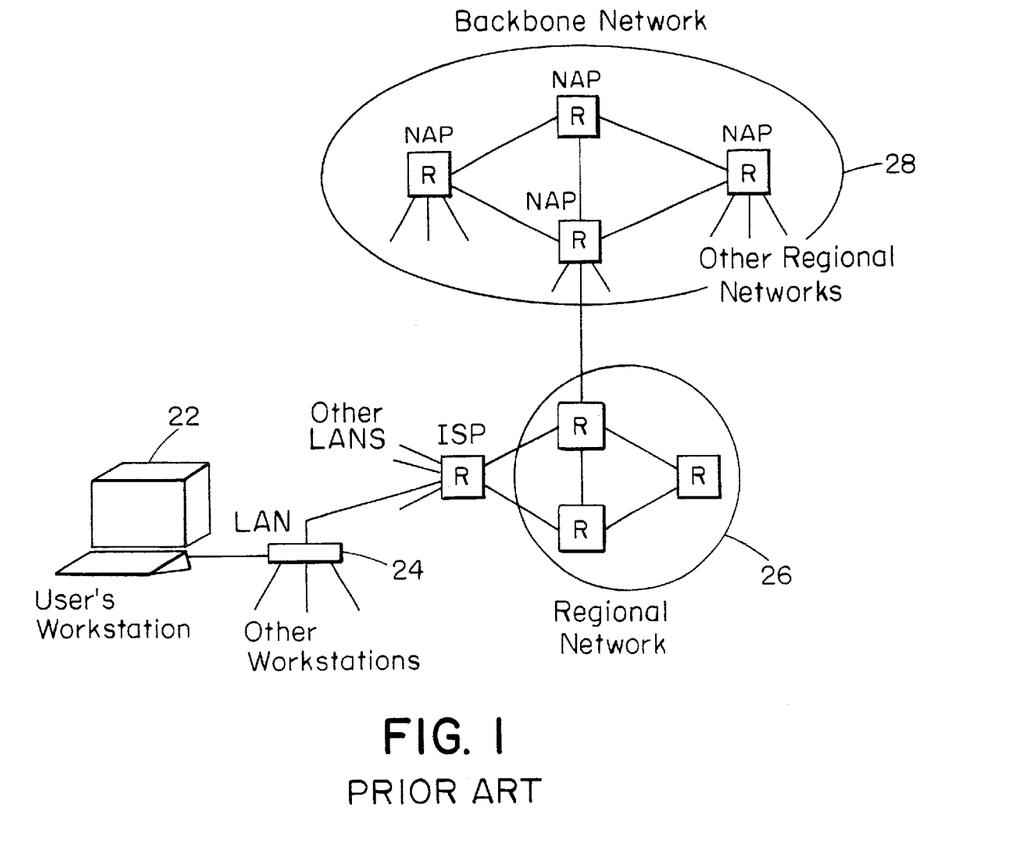
FIG. 1 illustrates the Internet arranged as a hierarchy of networks.

As illustrated in FIG. 1, the Internet is arranged as a hierarchy of networks. A typical end-user has a workstation 22 connected to a local-area network or LAN 24. To allow users on the LAN to access the rest of the Internet, the LAN is connected via a router R to a regional network 26 that is maintained and operated by a Regional Network Provider or RNP. The connection is often made through an Internet Service Provider or ISP. To access other regions, the regional network connects to the backbone network 28 at a Network Access Point (NAP). The NAPs are usually located only in major cities.

The network is made up of links and routers R. In the network backbone, the links are usually fiber optic communication channels operating using the SONET (synchronous optical network) protocol. SONET links operate at a variety of data rates ranging from OC-3 (155 Mb/s) to OC-192 (9.9 Gb/s). These links, sometimes called trunks, move data from one point to another, often over considerable distances.

Routers connect a group of links together and perform two functions: forwarding and routing. A data packet arriving on one link of a router is forwarded by sending it out on a different link depending on its eventual destination and the state of the output links. To compute the output link for a given packet, the router participates in a routing protocol where all of the routers on the Internet exchange information about the connectivity of the network and compute routing tables based on this information.

In recent years the volume of Internet traffic has been quadrupling each year. At the same time, the speed of the optical links that carry this traffic has been increasing at a slower rate, quadrupling every three years. Thus, to keep up with traffic demands, networks have added multiple links or trunks between network access points to scale bandwidth at a rate faster than the increase in individual link bandwidth. These multiple trunks may be transmitted on separate fibers or as separate channels wave-division multiplexed over a single fiber, or both.

Wavelength-division multiplexing (WDM) is an approach to increasing bandwidth between NAPs by multiplexing several channels on a single fiber. With this approach an existing fiber between two NAPs, which originally carried a single channel, is enabled to handle a number (typically 20) channels of the same rate. To accomplish this, a WDM multiplexer is used to combine several channels by modulating each with a slightly different optical wavelength or color of light. The channels, each at a different wavelength, are then combined into a single optical fiber. At the far end of the fiber, separating out the different colors of light demultiplexes the channels. Upgrading one or more fibers to WDM results in large numbers of parallel trunks between NAPs.

SUMMARY OF THE INVENTION

Prior art routers treat each of the multiple trunks between two NAPs, and hence two routers, as ordinary links. Each trunk is connected to a router port and all traffic is forwarded over a specific trunk. This has two significant disadvantages: the complexity of the routing table is increased, and it becomes difficult to balance load across the trunks. Instead of simply directing all westbound traffic out of New York to Chicago, for example, with prior art routers it is necessary to direct distinct portions of this traffic over each of the N trunks between the two cities. The traffic is divided over these trunks by making a different routing table entry for each portion of traffic to direct it over a particular trunk.

Prior art routers also have difficulty balancing the load across the set of trunks between two points. Traffic is divided over these trunks by the routing table, and hence by destination address. At different points in time, the traffic to a set of destinations mapped to one trunk may be greater than the traffic to the set of destinations mapped to a second trunk leading to load imbalance between the trunks.

Both of these problems, routing table complexity and load imbalance, increase in magnitude as the number of trunks between a pair of routers increases.

The router of the invention overcomes the limitation of prior art routers by treating all of the links or trunks to a given destination as a single composite trunk. With composite trunking, all of the westbound traffic out of New York, for example, would be directed onto the single composite trunk to Chicago rather than be divided into N separate portions, one for each of the N links to Chicago.

When a westbound packet arrives at the New York router, the routing table lookup selects the composite trunk to Chicago as the outgoing link for the packet. A separate trunk selection step then picks one of the multiple trunks to Chicago to carry this particular packet and the packet is forwarded to that trunk. The trunk selection is performed to balance load across the trunks while preserving packet ordering within individual flows. It may also be performed to select the 'closest' output port for a given packet.

The use of composite trunks has three primary advantages. First, it simplifies routing tables by allowing large groups of destinations to be mapped to a single composite output port rather than requiring that many smaller groups be individually mapped to distinct output ports. Second, composite trunking makes it easier to balance load across multiple trunks by allowing load to be dynamically shifted across the individual trunks making up a composite trunk without changing the routing function. Finally, composite trunking can give more efficient use of fabric channels in a direct fabric network by selecting the output trunk that is nearest the packet waiting to be transmitted.

In accordance with the invention, a network router comprises a plurality of trunk ports, including a composite port of plural ports. Those ports connect to plural trunks which serve as a composite trunk to a common destination. A routing fabric within the router transfers data packets between trunk ports. An output port selector selects an output port for a packet from a composite port. The router identifies a destination of packets, selects one of plural trunks forming a composite trunk to the destination and forwards the packet toward the destination on the selected trunk.

Preferably, the router maintains ordering of packets within a flow by routing the packets of the flow in a single fabric route within the router and over a single trunk of the composite trunk. The output port selector is able to balance load across the trunks of a composite trunk and may even provide dynamic balancing by changing port selection in response to changes in load. The output port selector may favor output ports having lesser distances to be traversed on the routing fabric from an input port.

Preferably, the output port selector determines the output port by table lookup. More specifically, a routing table maps destination addresses to composite trunks, and a forwarding table maps composite trunks to sets of routes within the routing fabric.

The invention is particularly applicable to the Internet where the destination addresses are Internet protocol addresses. The preferred routing fabric is a three dimensional torus.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 2:
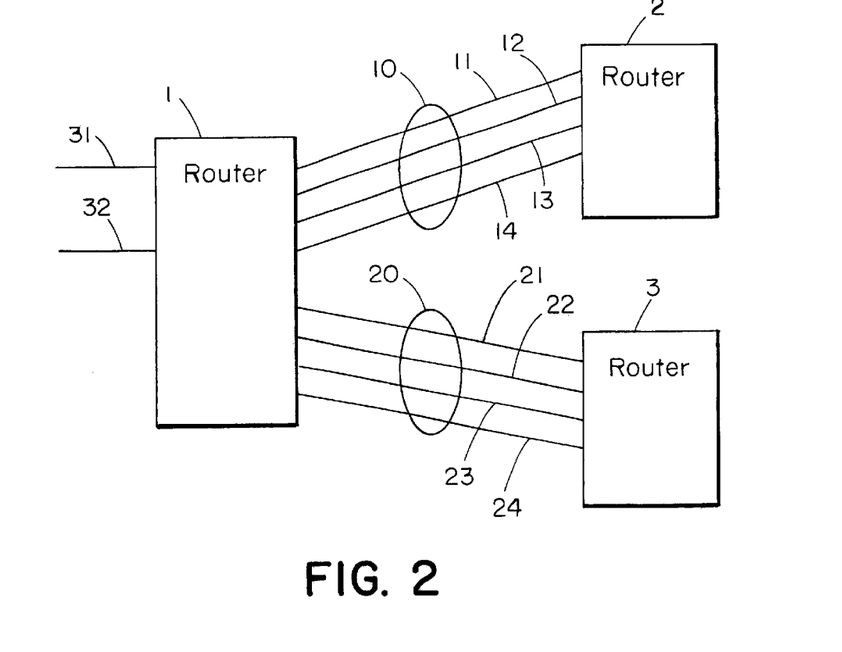
FIG. 2 illustrates a fragment of a network comprising three routers linked through composite trunks.

FIG. 2 shows a fragment of a network consisting of three routers, 1–3, and a number of trunks. There are four trunks, 11–14, that connect router 1 to router 2. In a prior art router, these trunks would be handled as completely separate outputs with each routing table entry specifying a single one of these trunks as a destination. In such prior art routers, no advantage is taken of the fact that these trunks have a common destination. In the present router, however, these four trunks, 11–14, are treated as a single composite trunk, 10, for purposes of routing. The figure also shows two additional trunks attached to router 1, 31 and 32, and a composite trunk, 20, consisting of four trunks, 21–24, that connects router 1 with router 3. In common practice, each trunk in the figure is actually a pair of communication channels, one in each direction.

Figure 3:
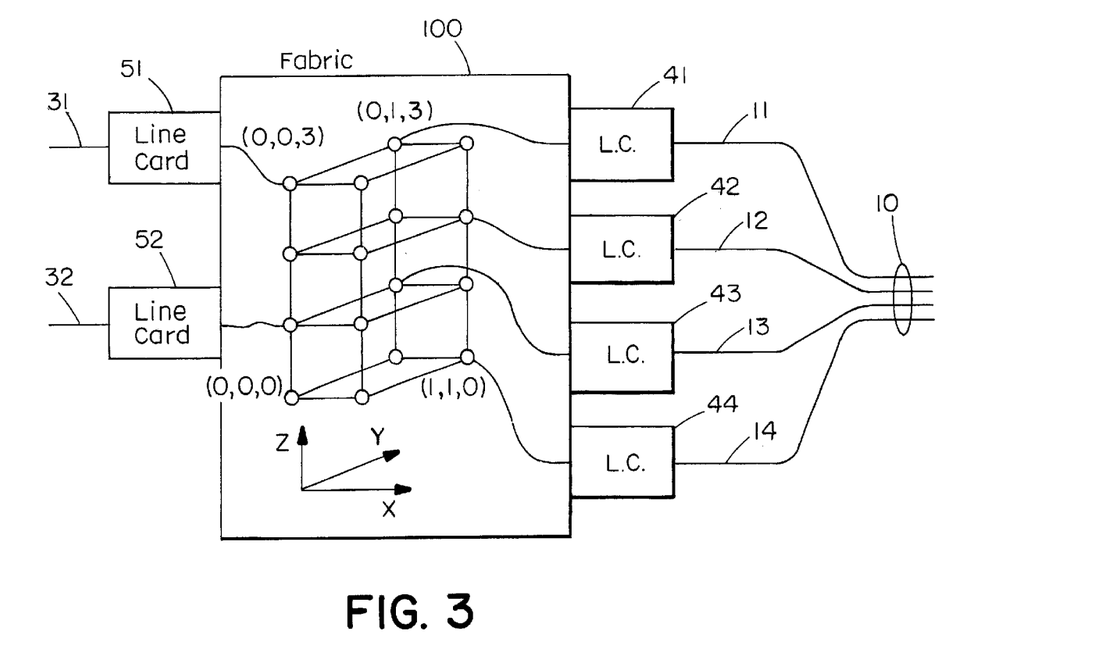
FIG. 3 illustrates one of the routers of FIG. 2.

A block diagram of a portion of router 1 is shown in FIG. 3. As shown, the router comprises a routing fabric 100 and line cards, each of which terminates a trunk and serves as a port between the trunk and routing fabric. For example, trunks 11–14 are terminated in line cards 51–54. The figure shows the preferred embodiment in which the routing fabric is a three-dimensional torus interconnection network. One skilled in the art of router design will understand that other fabric topologies such as crossbars, multi-stage networks, and buses can also be used with composite trunking.

In the preferred embodiment each node of the interconnection network is labeled with a 3-tuple giving its X, Y, and Z coordinates respectively. The figure shows some but not all of these labels. Each node is connected to its neighbors in six directions. End around connections, for example connecting (0,0,0) to (0,0,3) are included in the preferred embodiment but are not shown in the figure for clarity. In the preferred embodiment, the network can be scaled up to a 10×8×5 torus containing 400 nodes. Each line card connects to one node of the routing fabric. In FIG. 3, line card 51, for example, connects to fabric node (0,0,3).

Packets are forwarded between line cards by traversing the links of the router fabric. For example, a packet that arrives on trunk 31 and departs on trunk 41 would most likely be forwarded across the single Y link from (0,0,3) to (0,1,3). However a 3-hop route from (0,0,3) to (1,0,3) (1,1,3) and (0,1,3) is also possible. The details of forwarding packets across the routing fabric is described in pending patent application Ser. No. 08/918,556, filed Aug. 22, 1997, by William J. Dally, Philip P. Carvey, Larry R. Dennison and P. Alan King, which is incorporated herein by reference in its entirety.

Figure 4:
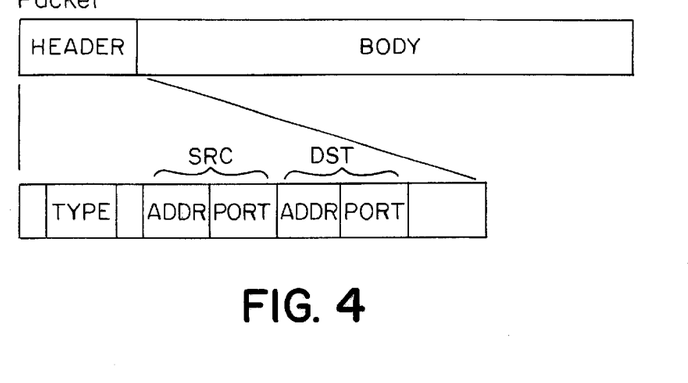
FIG. 4 illustrates an Internet protocol packet.

As shown in FIG. 4, each IP (Internet protocol) packet consists of a header and a body. The header contains a number of fields that include a packet type, a source IP address and port, and a destination IP address and port. The destination IP address is used to determine the output trunk on which the packet should be routed. All five of these fields together are used to identify the packet as belonging to a particular flow of packets. While not strictly required by the IP protocol, it is generally understood that the packets within a given flow must be transmitted in the order in which they arrive. To ensure this, the router assigns packets of the same flow to the same path through the routing fabric and to the same trunk of a composite trunk.

Figure 5A:
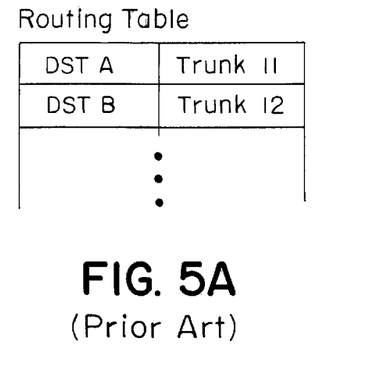
FIG. 5A illustrates a prior art routing table within an Internet router.
Figure 5B:
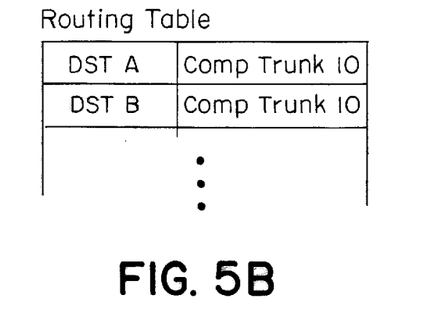
FIG. 5B illustrates a routing table within an Internet router embodying the present invention.

When a packet arrives at a router, the destination IP address of the packet is used to look up the output port to be used by the packet in a routing table. FIG. 5A shows a prior art routing table in which each destination IP address is associated with a specific output trunk. A method used in the router of this invention, in which a destination IP address may be associated with either a specific port and output trunk or a composite output port and trunk, is shown in FIG. 5B. In general, the routing table associates prefixes of destination addresses with output trunks, and the table is searched to find the longest prefix that matches the destination address. See Doeringer, Karjoth and Hassehi, "Routing on Longest-Matching Prefixes," *IEEE/ACM Transactions on Networking*, 1(4), February 1996, pp. 86–07. One organization of these routing tables and a method used to search for the longest matching prefix is described in pending provisional patent application entitled "Application and Method for Efficient Prefix Search" by Gregory Waters, Larry Dennison, Phillip Carvey and William J. Dally, filed on May 5, 1998, Ser. No. 09/104,314 which is incorporated herein by reference.

Figure 6:
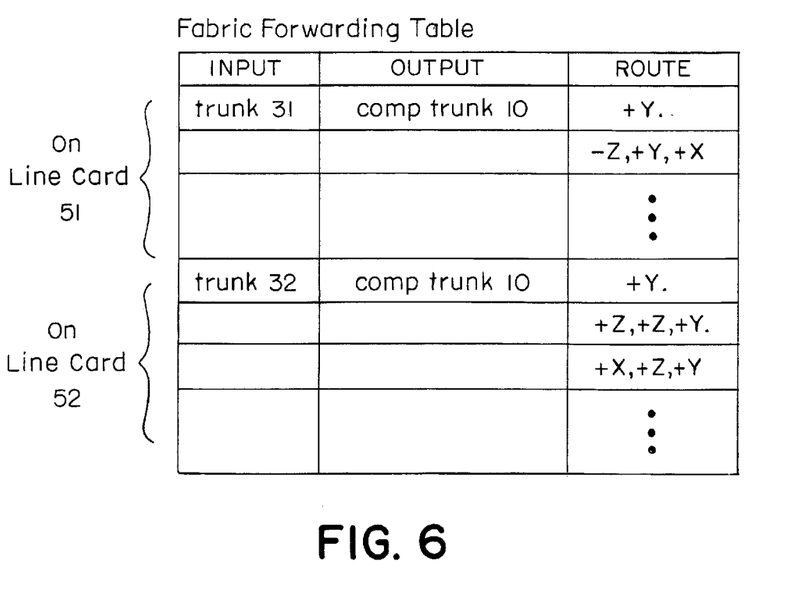
FIG. 6 illustrates a fabric forwarding table used in one embodiment of the invention.

After a packet has been assigned an output trunk, individual or composite, a route through the fabric router from the input line card to the output line card must still be determined. This fabric route is determined by a look up in the fabric forwarding table. As shown in FIG. 6, the fabric forwarding table associates a source trunk, destination trunk pair with a list of possible fabric routes between that source and destination. In practice, each source node stores only its portion of the table and so the lookup associates a destination trunk with a set of routes. In the preferred embodiment, the table entry and thus the route to be used is selected from the set of routes by hashing the flow identifier for the packet. This ensures that all packets of the same flow follow the same fabric route and hence remain in order.

In that preferred embodiment, the step of looking up the fabric route from the destination trunk resolves which specific trunk of a composite trunk is to be used for a given packet. With the fabric forwarding table of FIG. 6, for example, a packet from flow 0 arriving on trunk 31 destined for composite trunk 10 is assigned a fabric route of +Y. Referring to FIG. 3, this route takes the packet from node (0,0,3), associated with link card 51 and hence trunk 31, in the positive Y direction to node (0,1,3) where the packet exits through line card 41 to trunk 11. A second packet from flow 1 arriving on trunk 31 also destined for composite trunk 10 is assigned a fabric route of −Z, +Y, +X. This route takes the packet to node (1,1,2) where it exits via line card 42 to trunk 12. By distributing the fabric routes across the individual trunks comprising the composite trunk, traffic is distributed evenly across the composite trunk and thus statically balanced.

Figure 7:
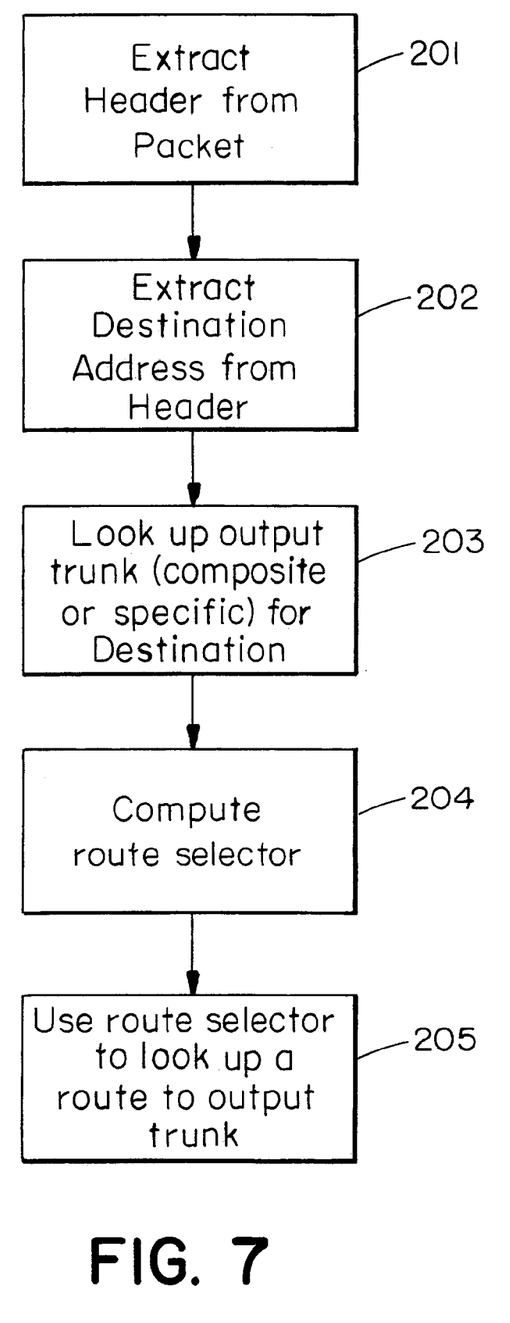
FIG. 7 is a flow chart of the routing process.

The process of forwarding an incoming packet is illustrated in the flowchart of FIG. 7. To start the processing, the header (see FIG. 4) is extracted from the packet in box 201 and the destination IP address is extracted from the header in box 202. Next, the destination IP address is used to look up the output trunk (composite or specific) in a routing table (see FIG. 5) in box 203. In the preferred embodiment, this step involves performing a search of the stored routing table to find the longest matching prefix of the destination address. In box 204 a route selector is computed by extracting the flow identifier from the packet header and hashing this flow identifier, for example using a bitwise exclusive-or operation. As described below, a relatively large route selector (12 bits) is used in the preferred embodiment to avoid excessive roundoff error in the division of traffic among routes and trunks. Finally, in box 205, the route selector and destination trunk are used to lookup a fabric route in the fabric forwarding table (see FIG. 6). This fabric route implicitly selects the specific trunk of a composite trunk to be used as the trunk at which the route terminates.

Figures 8, 9:
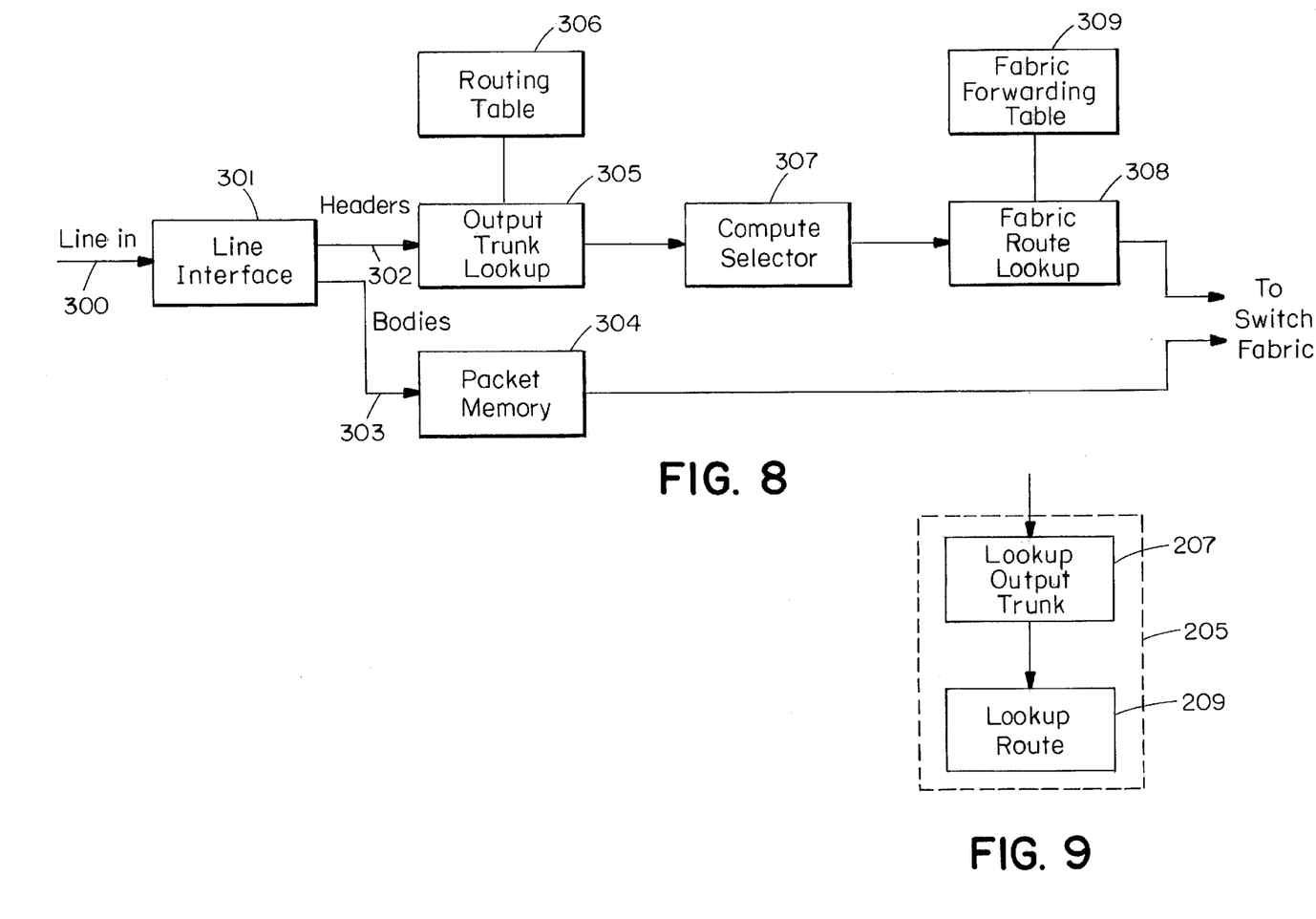
FIG. 8 illustrates the hardware pipeline used to process the method of FIG. 7.
FIG. 9 illustrates the route selection step of FIG. 7 in an alternative embodiment of the invention.

In the preferred embodiment, the forwarding process of FIG. 7 is pipelined as shown in FIG. 8. By pipelining the process, the router is able to process packets with a very high throughput by operating on several packets simultaneously. Packets arrive on an incoming line 300. For example this might be an OC-48c SONET line. A line interface 301 recovers data and clock from the incoming line, performs framing, and extracts packets from the incoming data stream. The line interface stores the body of each packet in the packet memory 304 and places the header of the packet, along with a pointer to the body, in a packet descriptor that it passes over line 302 to the next stage of processing. Packet descriptors from the line interface are received by the output trunk lookup pipeline stage 305. This stage searches a routing table (see FIG. 5) to find the longest matching prefix of the packet destination. The output trunk (composite or specific) associated with the matching prefix is selected as the output for this packet and recorded in the packet descriptor. The updated packet descriptor is then forwarded to box 307. In this stage, the source address, destination address, port numbers, and packet type fields are extracted from the packet header and used to form a flow identifier. The flow identifier is then hashed by exclusive-oring several 12-bit fields of the identifier with each other to form a route selector. The computed route selector is stored in the packet descriptor and it is forwarded to the fabric router. Within the fabric router, a fabric route lookup stage 308 uses the route selector and output trunk stored in the packet descriptor to index a fabric forwarding table (see FIG. 6) and lookup the route to be used to forward the packet to the output through the switch fabric. Using the pointer stored in the packet descriptor, the packet itself is then retrieved from packet memory and forwarded along with route and packet descriptor to the switch fabric. Once in the switch fabric, the route directs the packet to the appropriate output trunk.

In the preferred embodiment, the fabric forwarding table on each source node has 4096 entries for each destination node. This large number of entries is used to accurately divide traffic among multiple routes and trunks with a minimum of round off error. In effect, a table with 4096 entries gives 12 bits of precision in representing the fraction of traffic directed to each route and trunk. For example, consider a case where traffic to one composite trunk, A, is to be divided over 3 trunks, b,c, and d. If there are a small number of entries in the fabric forwarding table for A, it will not be possible to evenly divide the traffic over the three individual trunks. For example, if there are 8 entries for A, then the best we can do is to allocate 3 entries for b, 3 for c, and 2 for d. This gives a large imbalance (50%) between c and d due to the limited precision (3 bits) used to represent the fraction $\frac{1}{3}$. On the other hand, with 4096 entries, the assignment can be 1365 entries for b and c, and 1366 entries for d, an imbalance of less than 0.1%.

In an alternative embodiment of FIG. 9, the steps of determining the specific output trunk of a composite trunk to be used and determining the fabric route to reach that specific output trunk can be performed by two separate table lookups. The flow identifier and composite output trunk are used to determine a specific output trunk at 207. Finally, the fabric route to reach this specific output trunk is selected at 209 through a second forwarding table.

In either embodiment, appropriate setting of the fabric routing table can minimize the number of hops that a packet must travel in the routing fabric. Routes to nearby destination trunks can be associated with each source node. For example, in FIG. 6, the first route from line card 51 to composite trunk 10 takes the packet one hop to line card 41 and output trunk 11. The first route from line card 52 to composite trunk 10 takes the packet one hop to line card 43 and output trunk 13. A particular source node includes entries to multiple routes for load distribution but weights the number of entries to each route to favor the shortest route. This preferential selection of nearby output trunks for each source node can be performed without concern for reordering flows because flows are local to a single source node.

If one output trunk of a composite trunk becomes a bottleneck, the fabric forwarding table can be adjusted to dynamically balance the load across the output trunks. The load can be balanced by finding a forwarding table entry that directs packets to the overloaded output trunk and rewriting the route in this entry to direct packets to a more lightly loaded output trunk. By adjusting routes, and hence the distribution of flows, one at a time, the load incrementally approaches perfect balance across the output trunks. Each adjustment may momentarily reorder packets within the adjusted flows. However, after the adjustment is complete ordering will again be preserved.

Equivalents

While this invention has been particularly shown and described with references to preferred embodiments thereof, it will be understood by those skilled in the art that various changes in form and details may be made therein without departing from the spirit and scope of the invention as defined by the appended claims. Those skilled in the art will recognize or be able to ascertain using no more than routine experimentation, many equivalents to the specific embodiments of the invention described specifically herein. Such equivalents are intended to be encompassed in the scope of the claims.

What is claimed is:

1. A network router comprising:
    a plurality of trunk ports, including a composite port of plural ports to plural trunks which serve as a composite trunk to a common destination;
    a routing fabric for transfer of data packets between trunk ports; and
    an output port selector which selects an output port for a packet from a composite port the output port selector maintaining ordering of packets within a flow by routing the packets of the flow on a single trunk of a composite trunk.

2. A router as claimed in claim 1 wherein the output port selector further maintains ordering of packets within a flow by routing the packets of the flow along a single route through the router fabric.

3. A network router comprising;
    a plurality of trunk ports, including a composite port of plural ports to plural trunks which serve as a composite trunk to a common destination;
    a routing fabric for transfer of data packets between trunk ports; and
    an output port selector which selects an output port for a packet from a composite port, the output port selector favoring output ports having lesser distances to be traversed on the routing fabric from an input port.

4. A network router comprising:
    a plurality of trunk ports, including a composite port of plural ports to plural trunks which serve as a composite trunk to a common destination;
    a routing fabric for transfer of data packets between trunk ports; and
    an output port selector which selects an output port for a packet from a composite port, the output port selector comprising a routing table which maps destination addresses to composite trunks.

5. A router as claimed in claim 4 wherein the output port selector further comprises a forwarding table which maps composite trunks to sets of routes within the routing fabric.

6. A router as claimed in claim 5 wherein the output port selector maintains ordering of packets within a flow by routing the packets of the flow on a single trunk of a composite trunk.

7. A router as claimed in claim 6 wherein the output port selector further maintains ordering of packets within a flow by routing the packets of the flow along a single route through the router fabric.

8. A router as claimed in claim 6 wherein the network is the Internet and the destination addresses are Internet protocol addresses.

9. A router as claimed in claim 8 wherein the routing fabric is a three-dimensional torus.

10. A router as claimed in claim 5 wherein the output port selector balances load across the trunks of a composite trunk.

11. A router as claimed in claim 5 wherein the output port selector dynamically balances load across the trunks of a composite trunk.

12. A router as claimed in claim 5 wherein the output port selector favors output ports having lesser distances to be traversed on the routing fabric from an input port.

13. A router as claimed in claim 4 wherein the output port selector further comprises a forwarding table which maps composite trunks to sets of output ports.

14. A router as claimed in claim 13 wherein the output port selector further comprises a forwarding table which maps outputs to sets of routes within the routing fabric.

15. A router as claimed in claim 13 wherein the output port selector maintains ordering of packets within a flow by routing packets of the flow on a single trunk of a composite trunk.

16. A method of routing packets in a network comprising:
    identifying a destination of the packets;
    selecting one of plural trunks forming a composite trunk to the destination, the trunk being selected to maintain ordering of packets within a flow by routing the packets of the flow on a single trunk of a composite trunk; and
    forwarding the packets toward the destination on the selected trunk.

17. A method as claimed in claim 16 routing within a routing fabric is selected to maintain order of packets within a flow by routing the packets of the flow along a single route.

18. A method of routing packets in a network comprising:
    identifying a destination of the packets;
    selecting one of plural trunks forming a composite trunk to the destination, the trunk being selected to favor a lesser distance between input and output ports on a fabric within the router; and
    forwarding the packets toward the destination on the selected trunk.

19. A method of routing packets in a network comprising:
    identifying a destination of the packets;
    selecting one of plural trunks forming a composite trunk to the destination, the step of selecting one of plural trunks including the step of determining a composite trunk from a destination address through routing table lookup; and
    forwarding the packets toward the destination on the selected trunk.

20. A method as claimed in claim 19 wherein the step of selecting one of plural trunks further comprises selecting a route within a routing fabric through a forwarding table lookup.

21. A method as claimed in claim 20 wherein the route within the fabric is selected to preserve the order of packets within a flow.

22. A method as claimed in claim 21 wherein the routing within a routing fabric is selected to maintain order of packets within a flow by routing the packets of the flow along a single route.

23. A method as claimed in claim 20 wherein the trunk is selected to balance load across the trunks of a composite trunk.

24. A method as claimed in claim 20 wherein the trunk is selected to dynamically balance load across the trunks of a composite trunk.

25. A method as claimed in claim 20 wherein the trunk is selected to favor a lesser distance between input and output ports on a fabric within the router.

26. A method of routing packets in a network comprising:

identifying a destination of the packets from a final destination identifier included in the packet;

selecting one of plural trunks forming a composite trunk to the destination;

routing the packet within the router on a three-dimensional torus fabric from an input port to an output port; and forwarding the packets toward the destination on the selected trunk.

* * * * *